Figure 1:
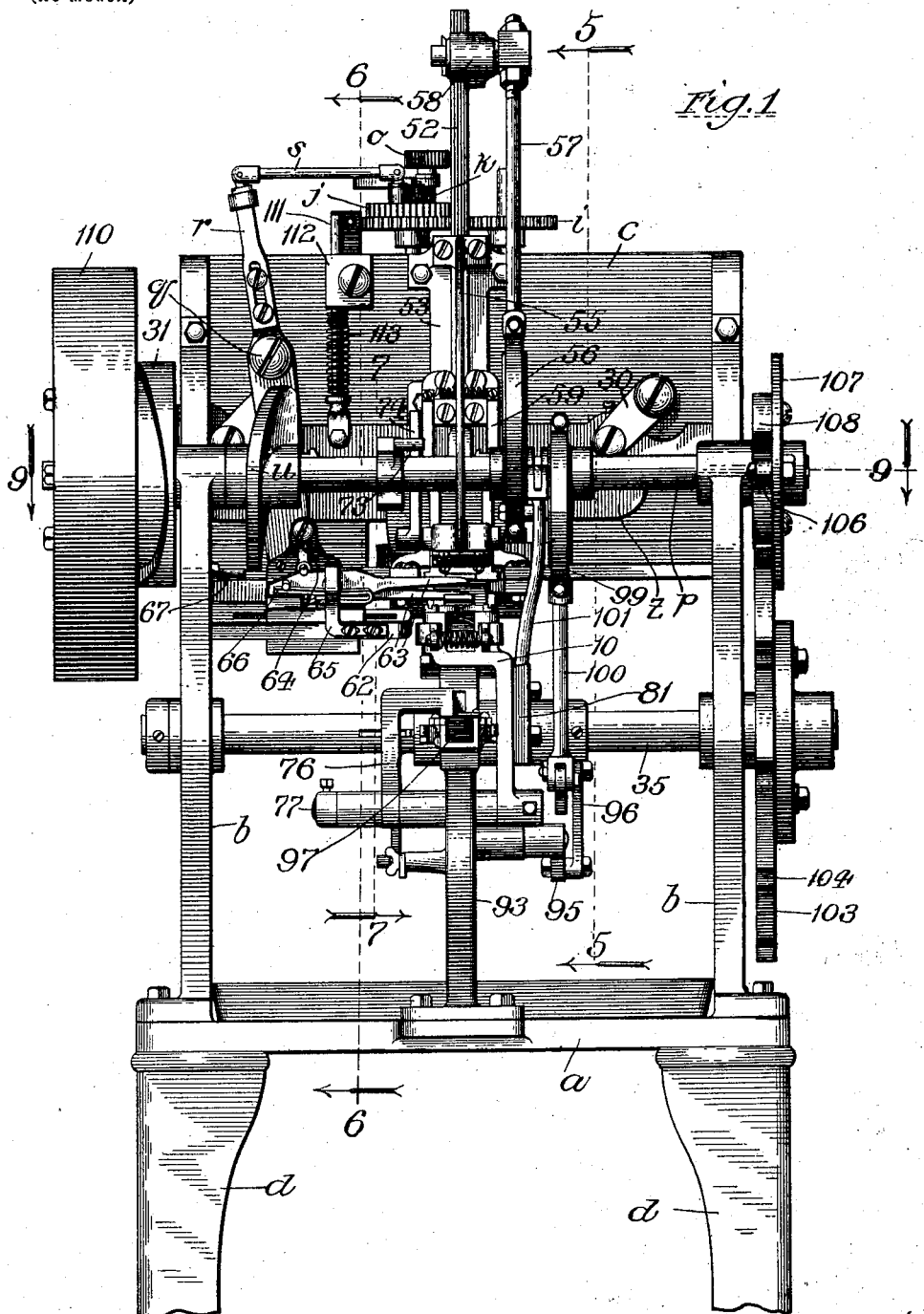

No. 691,737. Patented Jan. 28, 1902.
H. Y. ARMSTRONG.
CARAMEL CUTTING AND WRAPPING MACHINE.
(Application filed May 31, 1901.)

(No Model.) 15 Sheets—Sheet 1.

Witnesses
Harold G. Bautt
Harry O. Conner

Inventor
Harry Y. Armstrong
By Thomas F. Sheridan
Atty.

No. 691,737. Patented Jan. 28, 1902.
H. Y. ARMSTRONG.
CARAMEL CUTTING AND WRAPPING MACHINE.
(Application filed May 31, 1901.)
(No Model.) 15 Sheets—Sheet 2.

Witnesses:
Harold G. Barrett.
Harry J. Cromer.

Inventor:
Harry Y. Armstrong.
By Thomas F. Sheridan
Atty.

No. 691,737. Patented Jan. 28, 1902.
H. Y. ARMSTRONG.
CARAMEL CUTTING AND WRAPPING MACHINE.
(Application filed May 31, 1901.)
(No Model.) 15 Sheets—Sheet 3.

Witnesses:
Harold J. Barrett.
Harry J. Cromer

Inventor:
Harry Y. Armstrong:
By Thomas F. Sheridan
Atty.

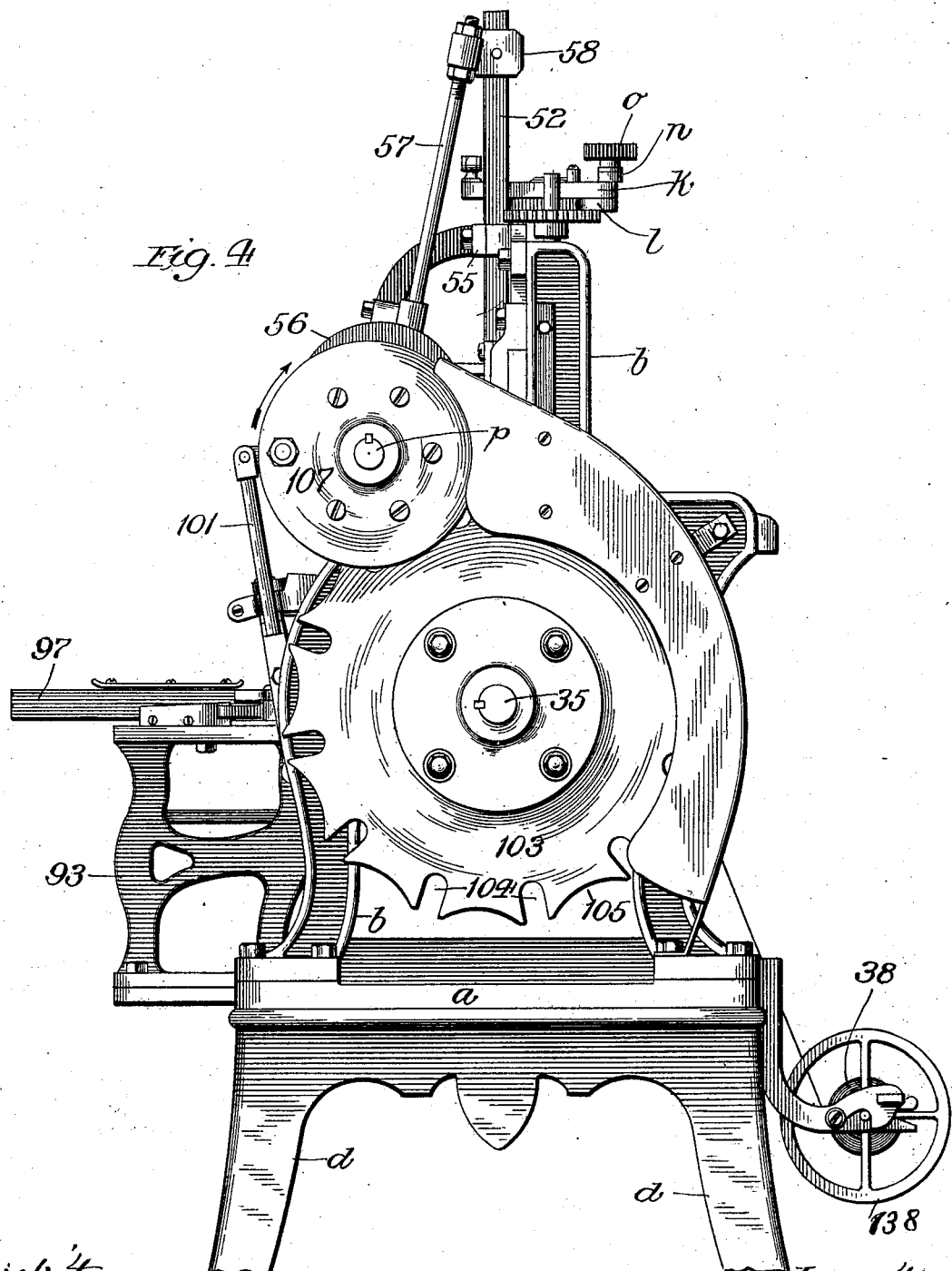

No. 691,737. Patented Jan. 28, 1902.
H. Y. ARMSTRONG.
CARAMEL CUTTING AND WRAPPING MACHINE.
(Application filed May 31, 1901.)
(No Model.) 15 Sheets—Sheet 5.
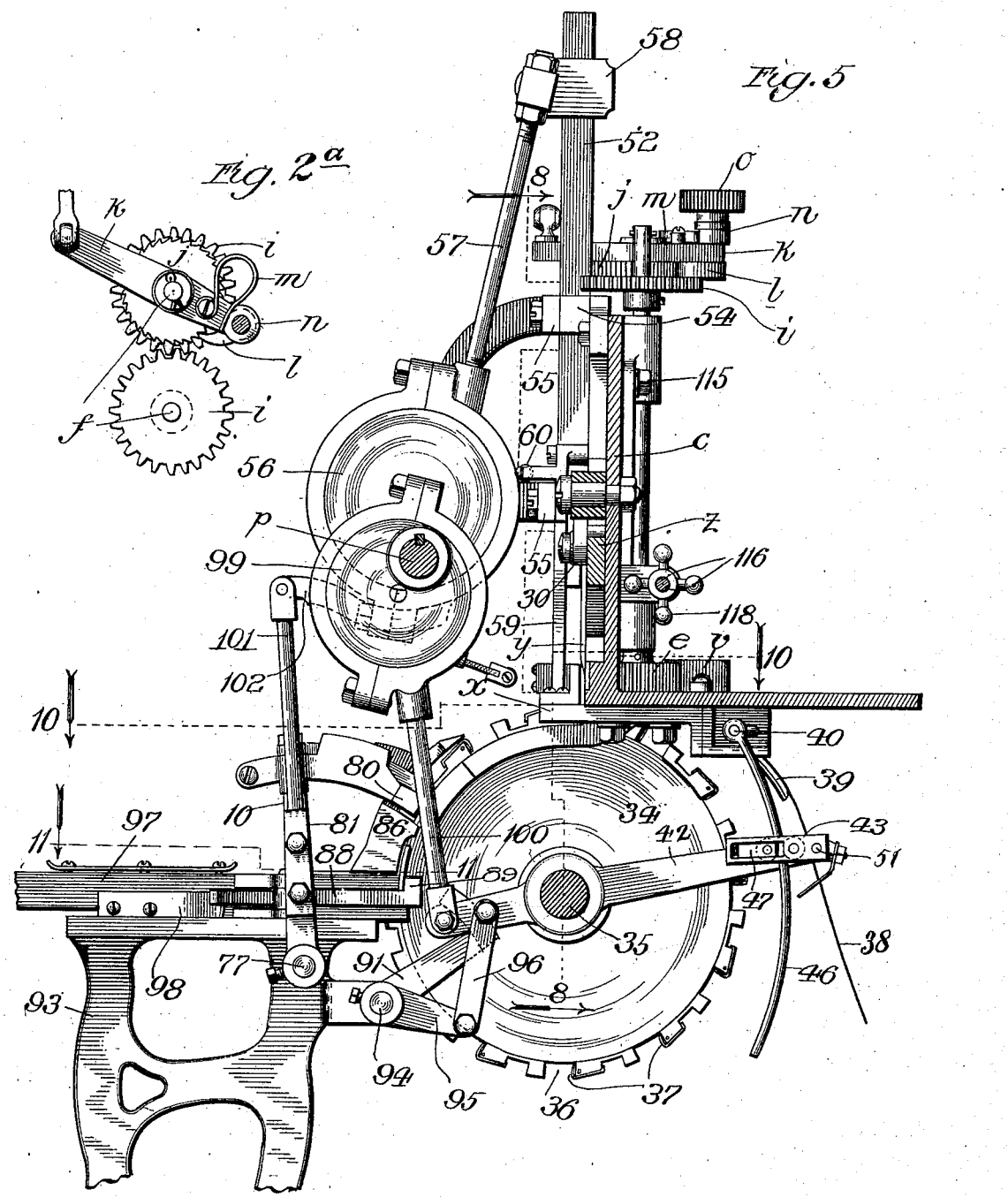

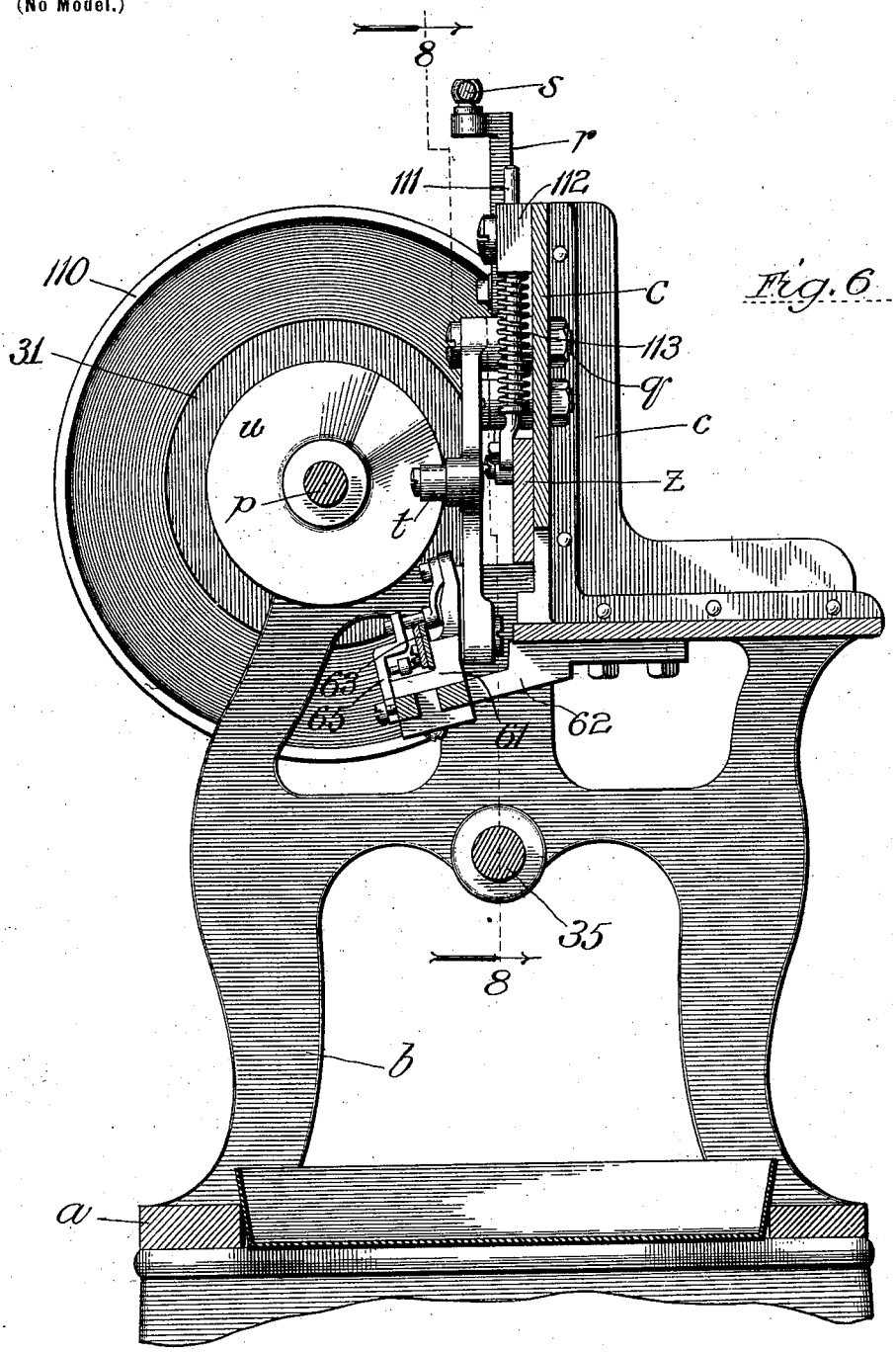

No. 691,737.    Patented Jan. 28, 1902.
H. Y. ARMSTRONG.
CARAMEL CUTTING AND WRAPPING MACHINE.
(Application filed May 31, 1901.)
(No Model.)    15 Sheets—Sheet 7.
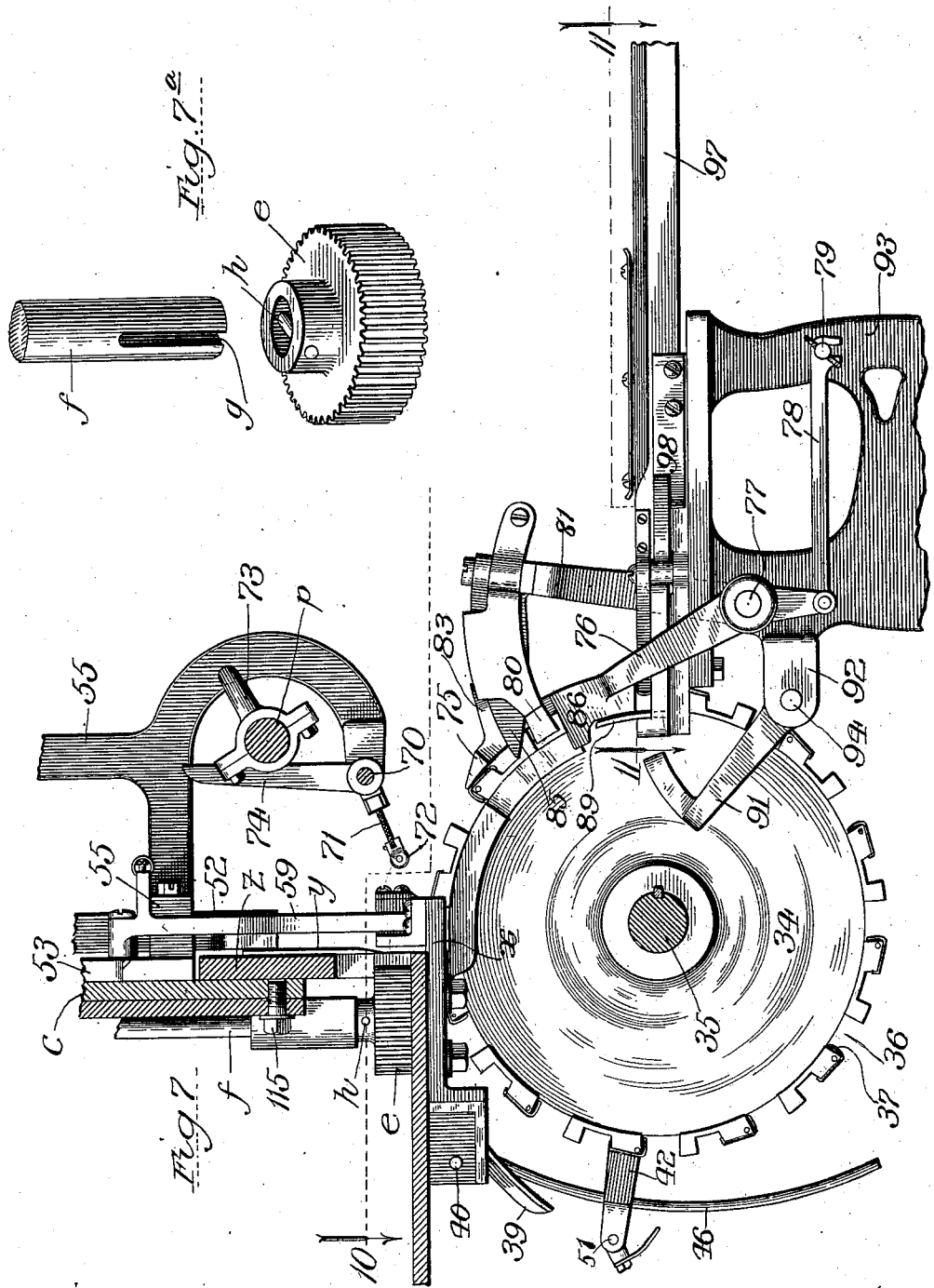
Witnesses:
Harold S. Barrett
Harry J. Cramer
Inventor:
Harry Y. Armstrong
By Thomas F. Sheridan
Atty.

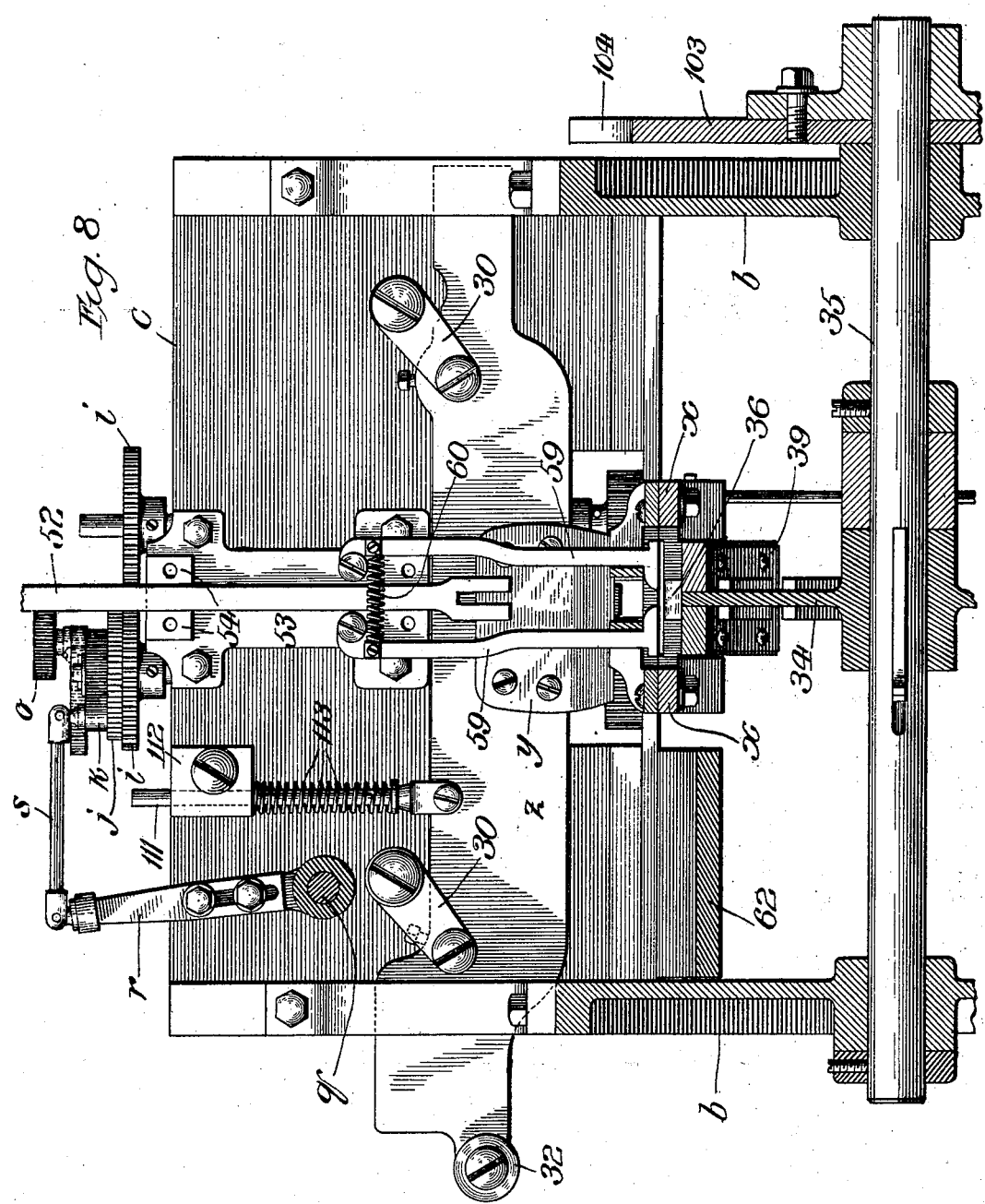

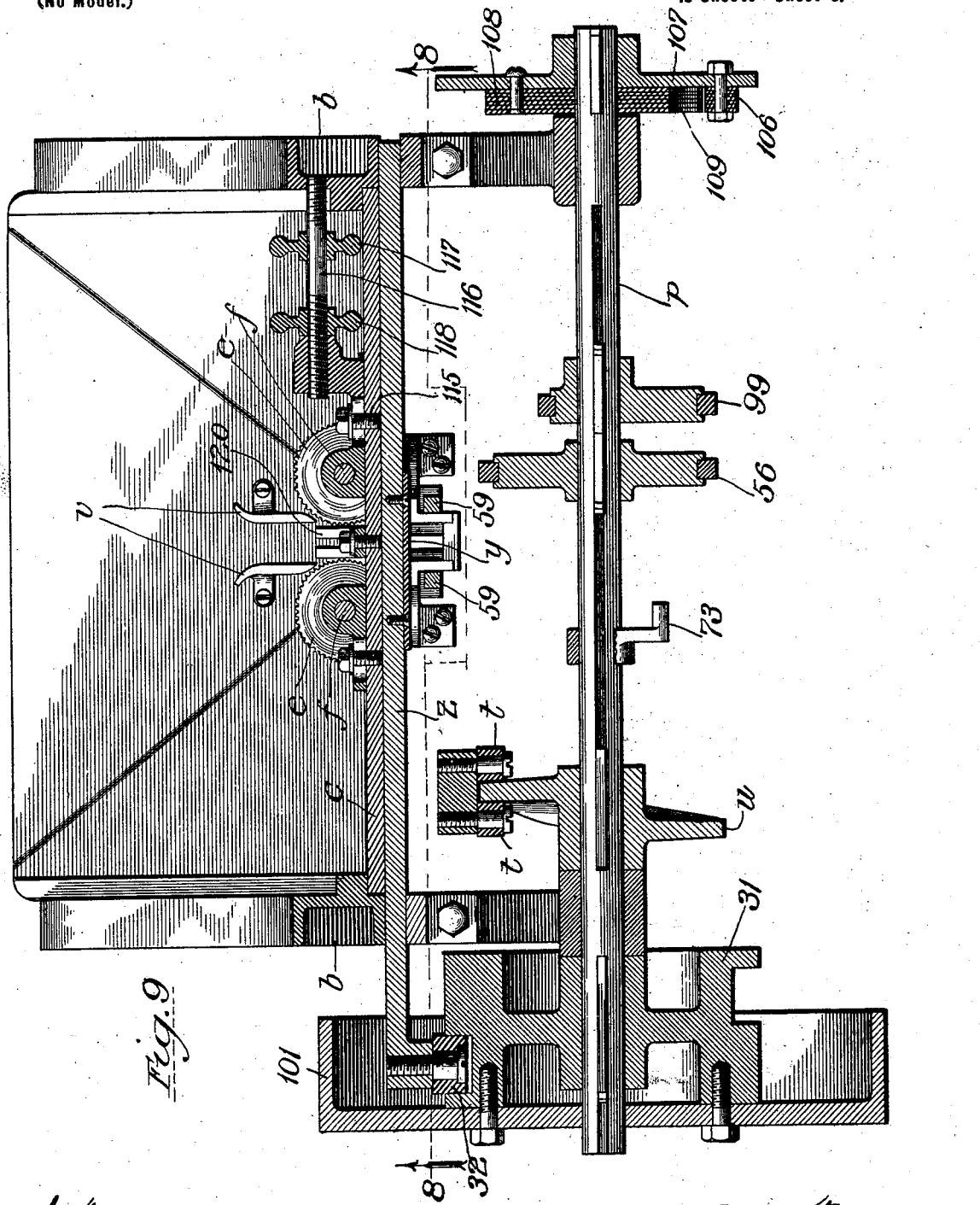

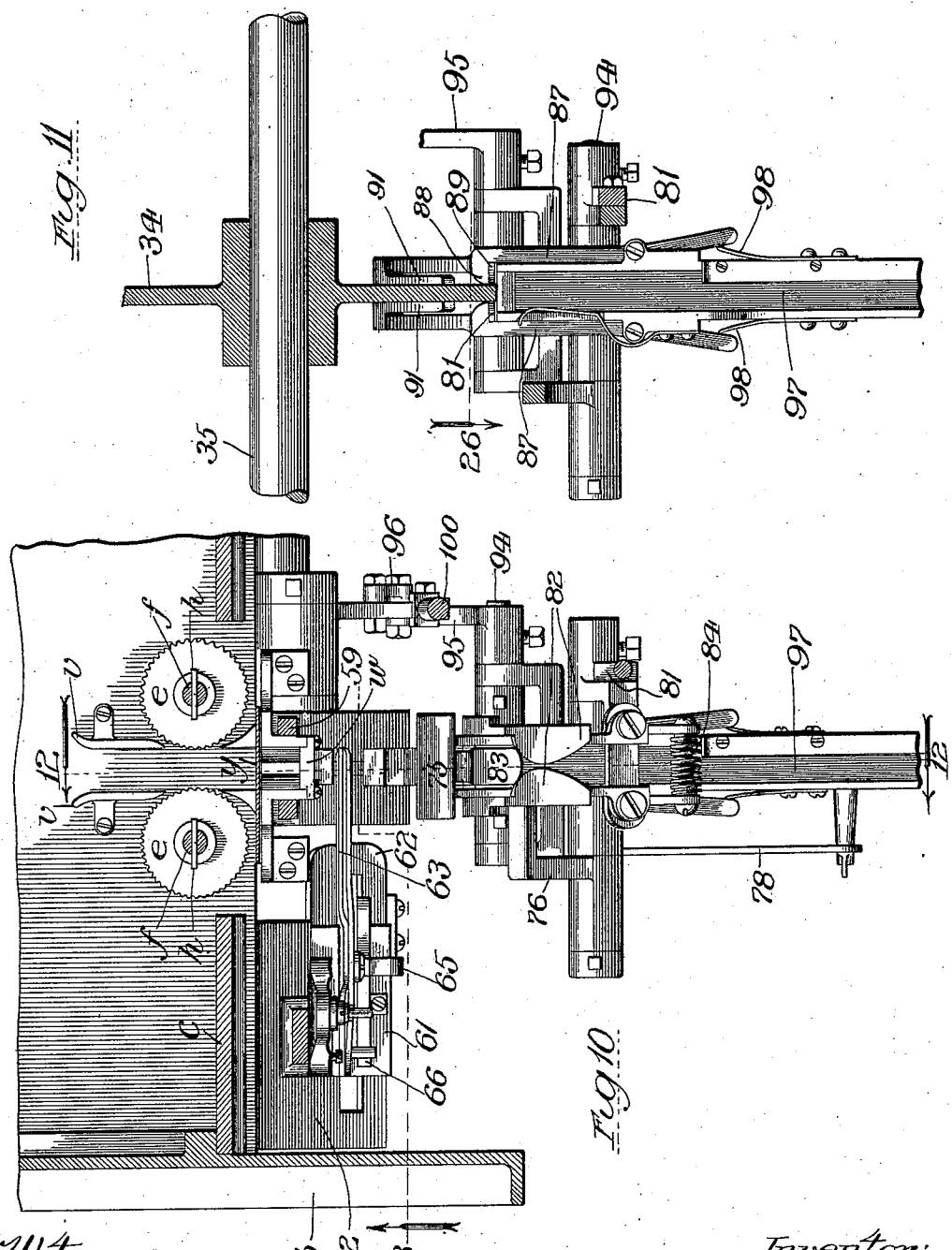

No. 691,737. Patented Jan. 28, 1902.
H. Y. ARMSTRONG.
CARAMEL CUTTING AND WRAPPING MACHINE.
(Application filed May 31, 1901.)
(No Model.) 15 Sheets—Sheet 11.
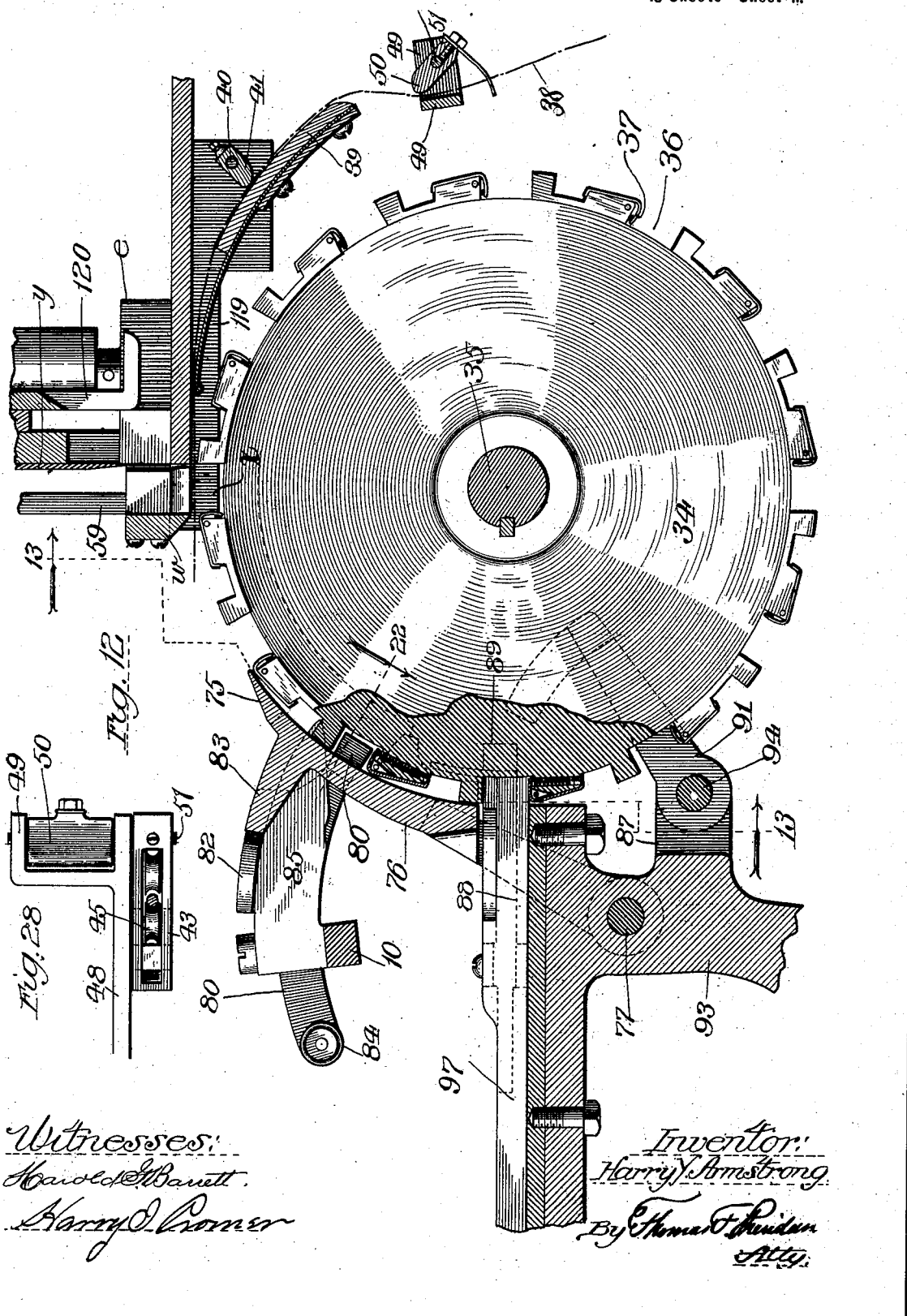

No. 691,737. Patented Jan. 28, 1902.
H. Y. ARMSTRONG.
CARAMEL CUTTING AND WRAPPING MACHINE.
(Application filed May 31, 1901.)
(No Model.) 15 Sheets—Sheet 12.
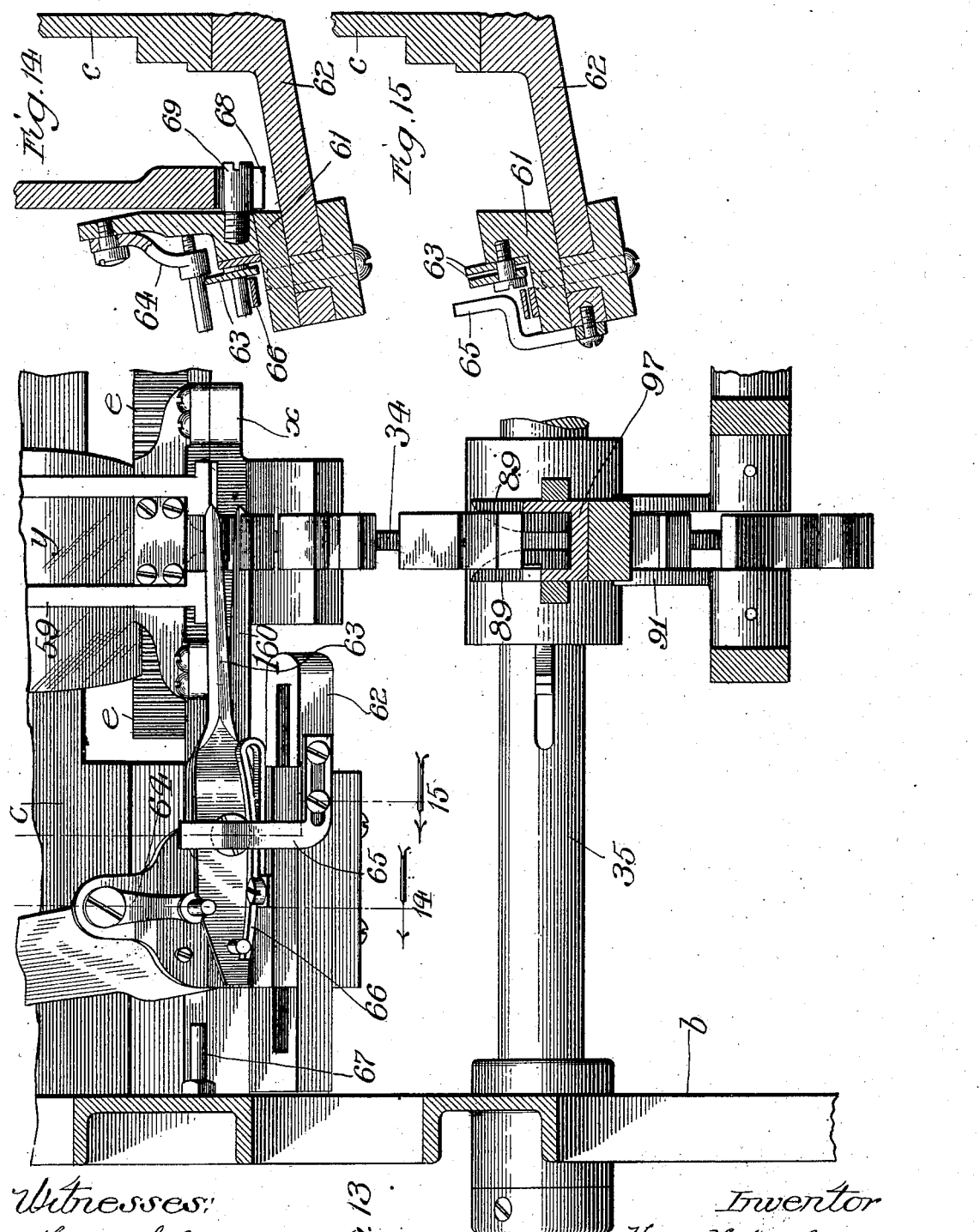

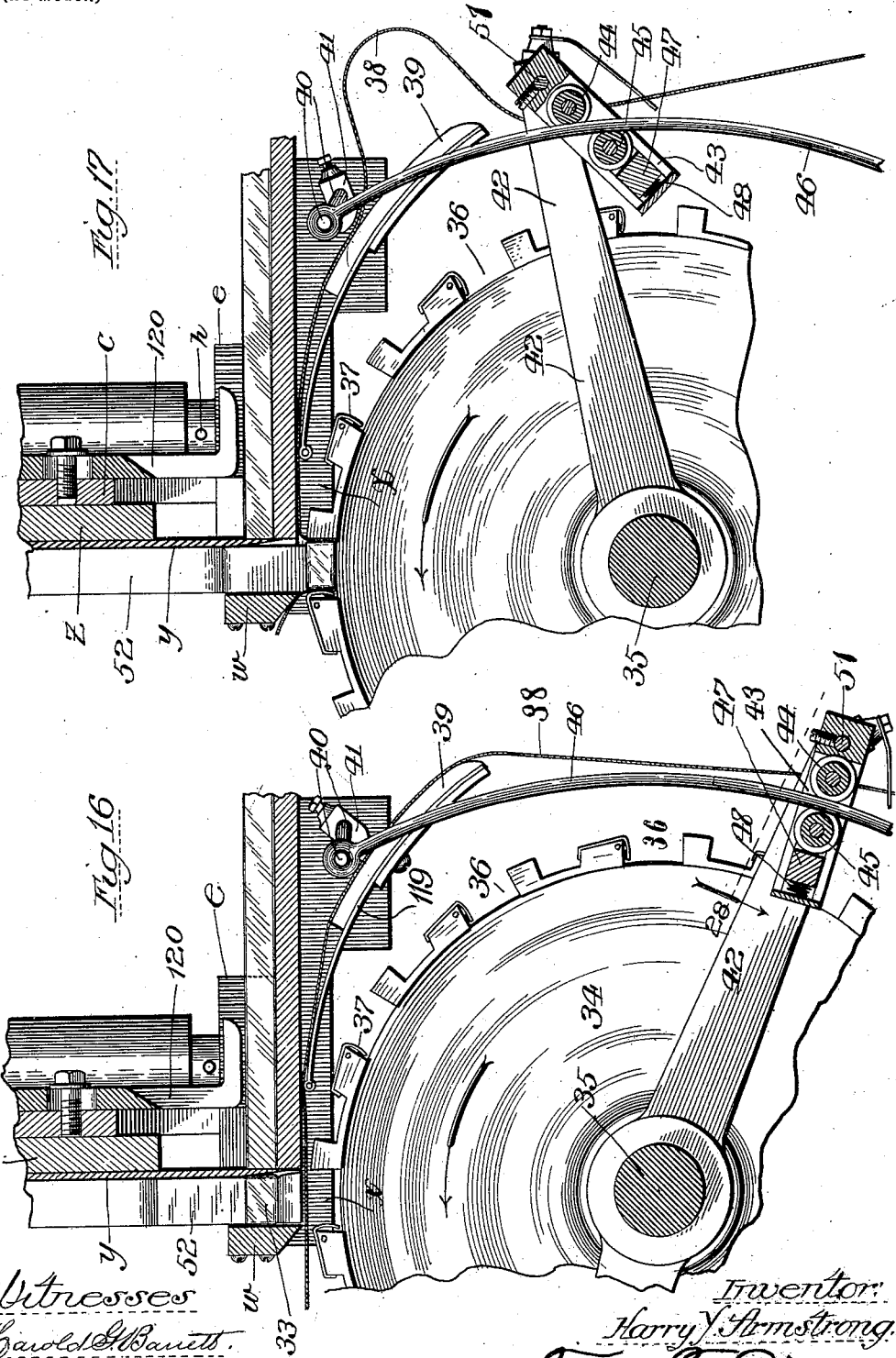

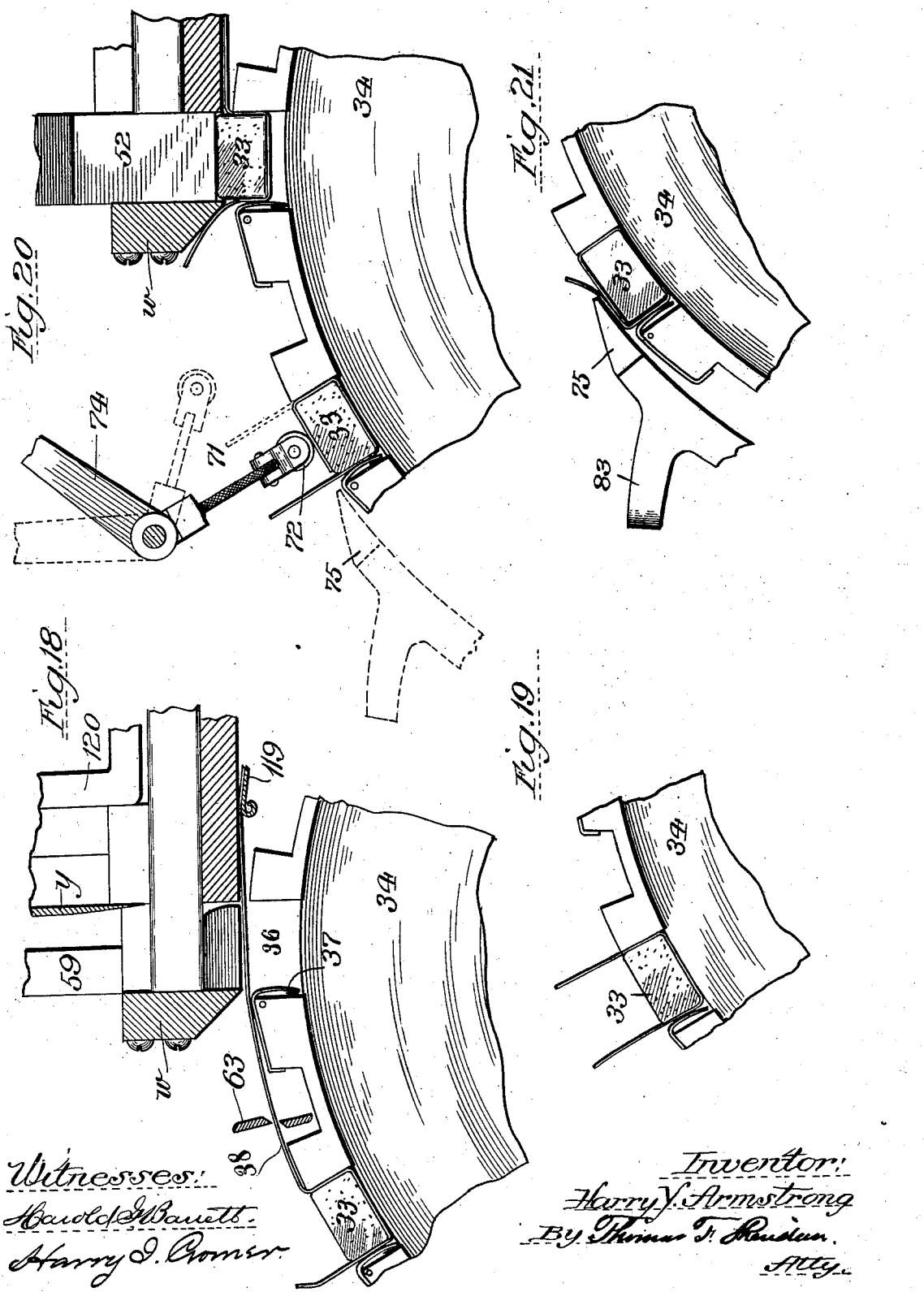

No. 691,737. Patented Jan. 28, 1902.
H. Y. ARMSTRONG.
CARAMEL CUTTING AND WRAPPING MACHINE.
(Application filed May 31, 1901.)
(No Model.) 15 Sheets—Sheet 15.
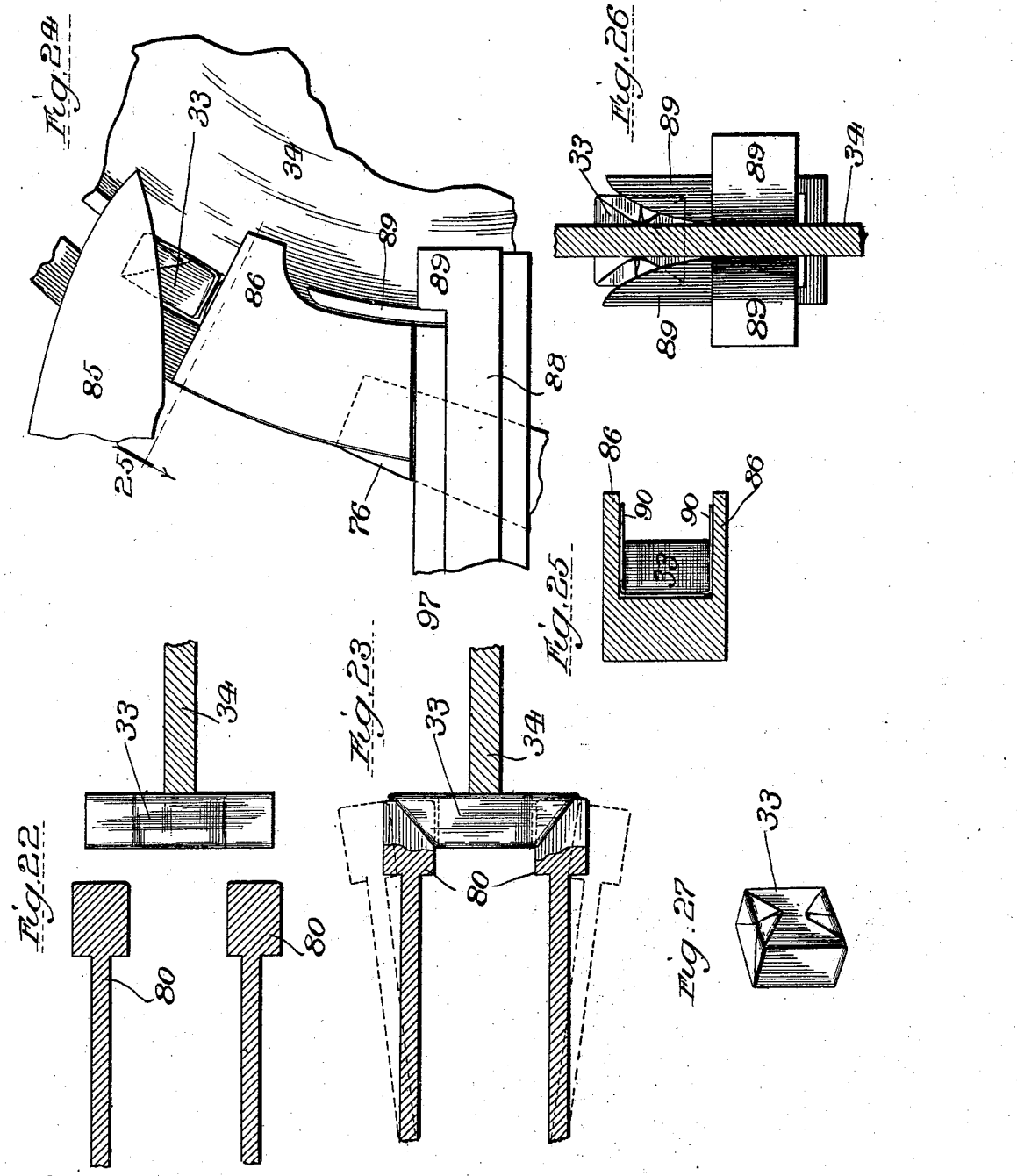

UNITED STATES PATENT OFFICE.

HARRY Y. ARMSTRONG, OF ELGIN, ILLINOIS.

CARAMEL CUTTING AND WRAPPING MACHINE.

SPECIFICATION forming part of Letters Patent No. 691,737, dated January 28, 1902.

Application filed May 31, 1901. Serial No. 62,586. (No model.)

*To all whom it may concern:*

Be it known that I, HARRY Y. ARMSTRONG, a citizen of the United States, residing at Elgin, in the county of Kane and State of Illinois, have invented certain new and useful Improvements in Caramel Cutting and Wrapping Machines, of which the following is a specification.

The invention relates to that class of machines which are used for the purpose of receiving or taking candy-caramel strips or substances of similar plasticity, cutting them into blocks or cubes of the desired size and shape, and wrapping or folding paper around them to prepare them for shipment.

The principal object of the invention is to provide a simple, economical, and efficient machine for cutting a strip of candy-caramel or similar plastic substances in desired cubes and wrapping paper around them to form packages for shipment; and the invention consists in the features, combinations, and details of construction hereinafter described and claimed.

Figure 2:
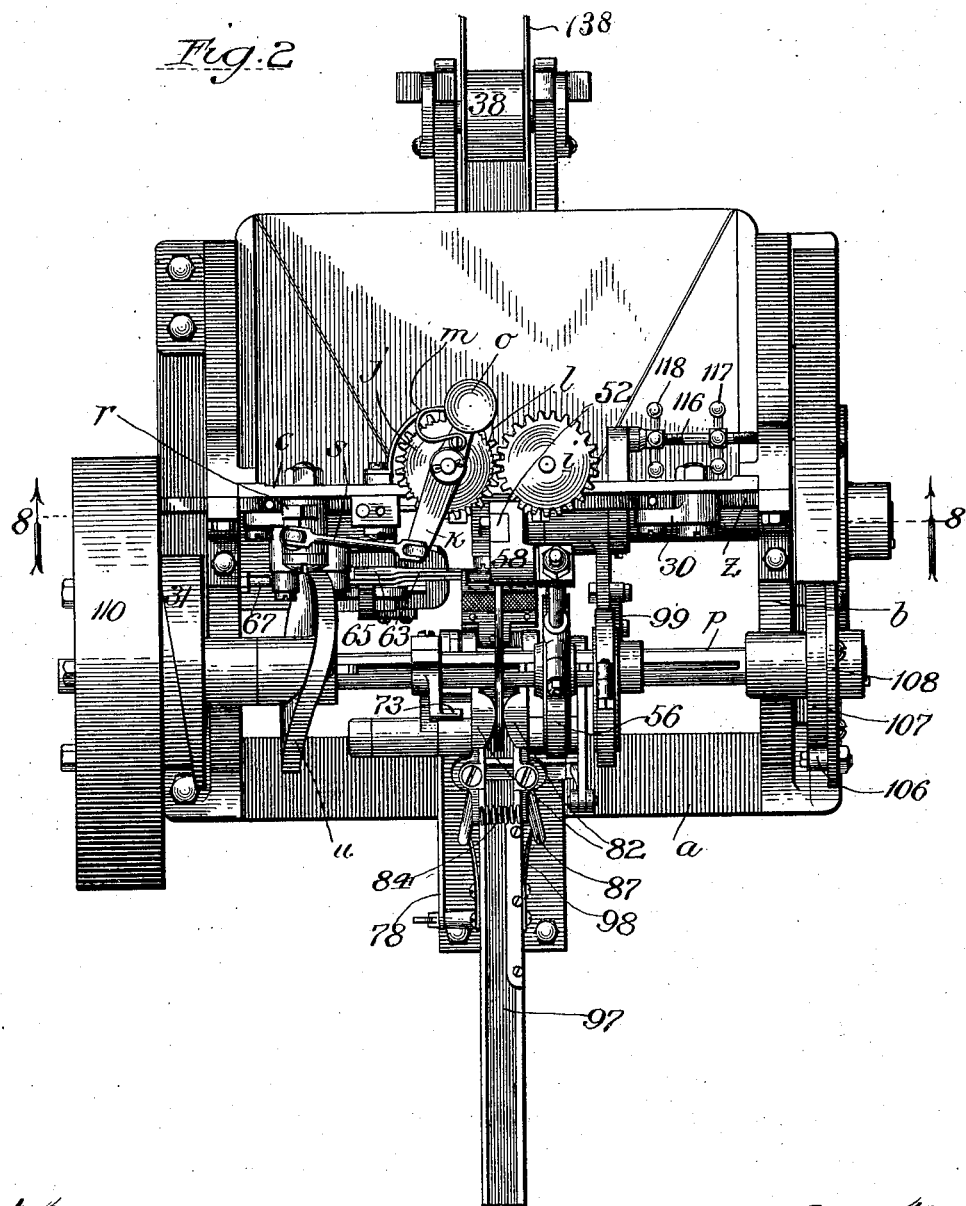
Figure 3:
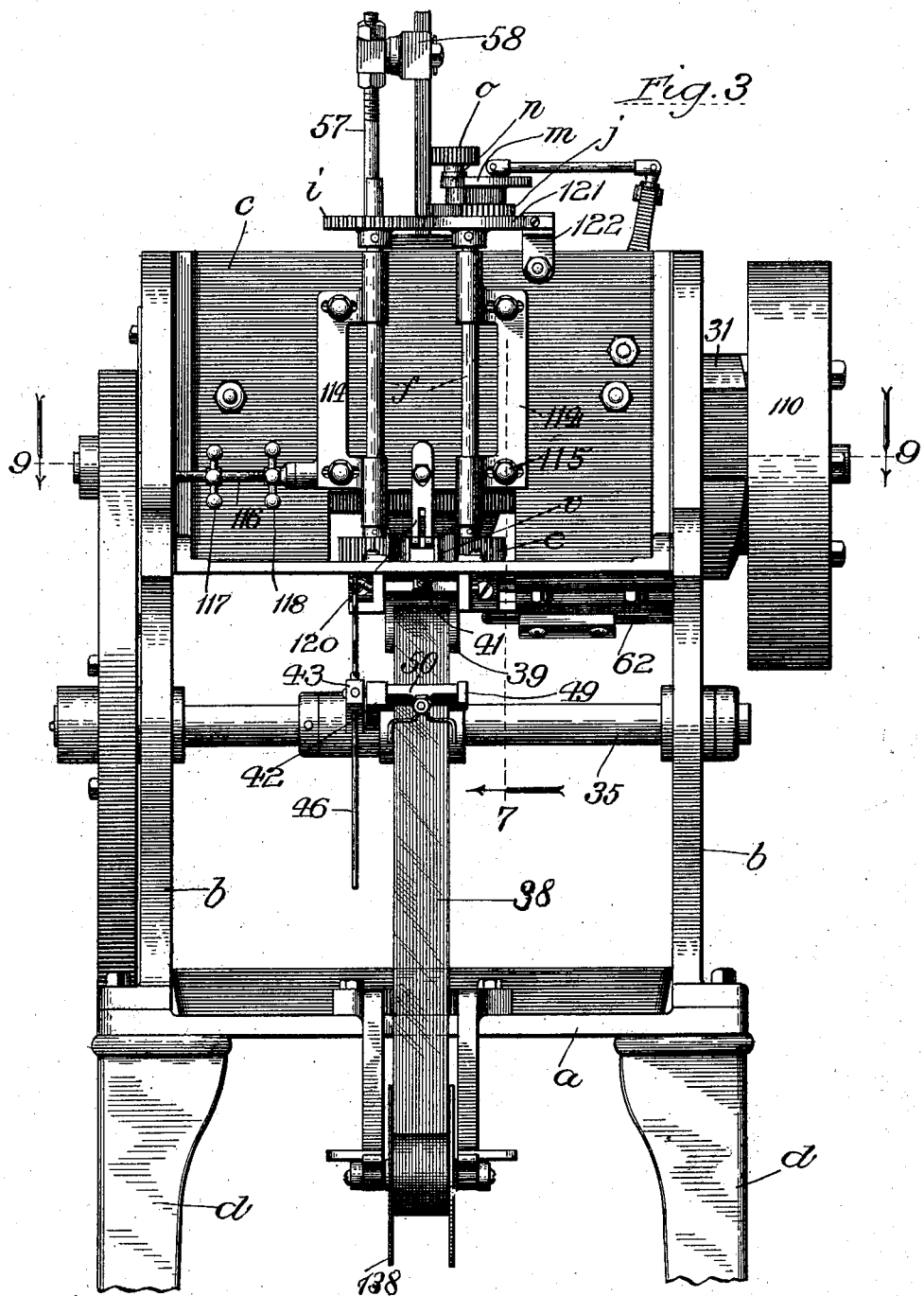

In the accompanying drawings, Figure 1 is a front elevation of a machine constructed in accordance with these improvements; Fig. 2, a plan view of the same looking at it from above; Fig. 2ª, a plan view of the gear-and-ratchet mechanism for operating the candy-feeding mechanism; Fig. 3, a rear elevation of the machine; Fig. 4, a side elevation looking from the right-hand side of Fig. 1; Fig. 5, a vertical sectional elevation taken on line 5 of Fig. 1 looking in the direction of the arrow; Fig. 6, an enlarged vertical sectional elevation taken on line 6 of Fig. 1; Fig. 7, an enlarged vertical sectional elevation of a portion of the machine, taken on line 7 of Figs. 1 and 3 looking in the direction of the arrow; Fig. 7ª, a perspective view of one of the feed-rolls and its detachable relation with the operating-shaft, a part of which is also shown in perspective view; Fig. 8, an enlarged elevation of a portion of the machine, showing the cutting and adjacent mechanisms, taken on line 8 of Figs. 2, 5, 6, and 9 looking in the direction of the arrows; Fig. 9, an enlarged plan sectional view taken on lines 9 of Figs. 1 and 3 looking in the direction of the arrows; Fig. 10, an enlarged plan sectional view of a portion of the machine, taken on lines 10 of Figs. 5 and 7 looking in the direction of the arrows; Fig. 11, a similar view of a portion of the mechanism, taken on lines 11 of Figs. 5 and 7; Fig. 12, an enlarged sectional elevation of the package-holding rotatable head and a portion of the adjacent mechanism, taken on line 12 of Fig. 10 looking in the direction of the arrow; Fig. 13, an enlarged sectional elevation taken on lines 13 of Figs. 10 and 12; Figs. 14 and 15, enlarged sectional details taken on the lines 14 and 15, respectively, of Fig. 13; Fig. 16, an enlarged sectional detail of a portion of the paper-feeding mechanism shown in Fig. 12 with the strip of paper in position to receive a cut cube of candy; Fig. 17, a similar view showing the cube of candy-caramel as pressed into engagement with the paper strip and into one of the holder-pockets on the rotatable head; Fig. 18, an enlarged sectional detail of a portion of the mechanism shown in Figs. 16 and 17 and with the rotatable head moved forward one step in its rotation and the paper-cutting mechanism in position to cut the paper; Fig. 19, a detail of the mechanism shown in Fig. 18, showing the package as it appears after the paper has been cut and the first folding performed; Fig. 20, a similar view to that shown in Fig. 18, showing the mechanism performing the second folding or wrapping of the paper; Fig. 21, a detail of the mechanism shown in Fig. 20 with the rotatable head moved forward a second step in its rotation so as to bring the candy cube with its sheet of paper in position to be folded for the third time; Fig. 22, a sectional detail of the pivotal fingers for performing the fourth fold of the paper, taken on line 22 of Fig. 12; Fig 23, a view of the mechanism shown in Fig. 22 just as the fourth fold of the paper is finished in full lines and showing in dotted outline the same fingers in position to pass by the paper; Fig. 24, an enlarged detail of a portion of the mechanism shown near the right-hand side and about the center of Fig. 7 with the mechanism in position to perform the fifth fold of the paper; Fig. 25, a sectional detail of the mechanism for performing the sixth fold of the paper, taken on line 25 of Fig. 24; Fig. 26, an enlarged sectional detail of a portion of the mechanism that performs the seventh and final fold of the package, taken about on line 26 of Fig. 11; Fig. 27, a perspective view of the completed package; and Fig. 28, a sectional view of the paper-clamping mechanism, taken on line 28 of Fig. 16.

In constructing a machine in accordance with these improvements a frame portion is provided comprising a bed $a$, having upright pillars or standards $b$ secured thereto and joined together at or near their top portion by an angle-plate $c$, the bed being supported upon legs $d$, all of the desired size, shape, and strength to hold the operative and other parts in position.

It will be understood that in this class of machines it is desirable to form the candy or substances of substantially the same nature into strips of the desired length and thickness, so that it can be readily fed into the machine for the purpose of being cut into cubes and wrapped in paper to form the desired-sized packages. To feed the candy into the machine a pair of indented feed-wheels $e$ is provided and mounted upon the horizontal portion of the angle-plate adjacent to the forward edge thereof, as shown particularly in Figs. 2, 9, and 10, so that they rotate in a horizontal plane and provide a space between them, as shown particularly in Fig. 10, through which the strip of candy may be passed into engagement with the operative mechanisms hereinafter described. To drive these rolls, a pair of shafts $f$ is provided of a diameter, as shown particularly in Fig. 7$^a$, adapted to enter the bore in the hub of the feeding-wheels, and are slotted, as shown at $g$, so that they may detachably engage a transverse pin $h$ and give the wheels the proper rotation, at the same time permitting an easy disengagement of the parts. To rotate these feed-shafts, a pair of intermeshing gears $i$ is provided (see Figs. 1 and 8) and secured to the shafts at or near the upper end thereof, so that the rotation imparted to either one of these gears is likewise imparted to the other. It will be understood that it is necessary only to impart a motion primarily to one of these gears. In order to accomplish this, one of such gears, preferably the one to the left, as shown in Figs. 1 and 8, is provided with a ratchet-wheel $j$, which is secured thereto. Pivotally mounted upon a vibratable lever $k$ is a pawl $l$, arranged to engage the ratchet-wheel, so that as the pawl-lever is operated in one direction it moves its pawl to engage and rotate the ratchet-wheel in the same direction, and as it is vibrated in the opposite direction it permits the pawl to slide over the teeth of the ratchet-wheel. A tension-spring $m$ is provided, one end of which is secured to the ratchet-wheel and the other arranged to engage with flattened surfaces upon the pivot-pin $n$ of the pawl and yieldingly hold such pawl either in or out of engagement with the ratchet-wheel, as shown particularly in Figs. 2$^a$ and 3. The upper end of this pawl pivot-pin is provided with a knurled handle $o$, which the operator can grasp between the thumb and finger for the purpose of throwing the pawl into or out of engagement with the ratchet-wheel, and thereby provide for the stopping or starting of the candy feeding, which may be very desirable at times.

To provide for the movement and operation of the vibratable pawl-lever, ratchet, and other parts above described, a main shaft $p$ is provided and rotatably mounted in suitable brackets secured to the vertical portion of the angle-plate, as shown particularly in Figs. 2 and 9. Vibratingly mounted on this angle-plate upon a stud $q$ is an intermediate lever $r$, the upper end of which is connected to the pawl-lever by means of a connecting-link $s$, which has a knuckle-joint in engagement with both of the levers, as generally shown, particularly in Fig. 8. The lower portion of this intermediate vibratable lever $r$ is provided with a pair of rolls $t$, straddling a plate-cam $u$, as shown particularly in Figs. 5 and 9, which plate-cam is rigidly secured to the main driving-shaft, so that as such shaft rotates the intermediate vibratable lever is vibrated, which transfers the vibrating motion to the vibratable pawl-lever and through it to the other parts. The horizontal portion of the angle-plate is also provided with a pair of guides $v$, (shown particularly in Figs. 9 and 10,) between which the candy strip is fed into the feed-wheels. The insertion of the candy strip is limited by a stop $w$, (shown particularly in Figs. 16 and 17,) which is secured to a pair of brackets $x$, in turn secured to and projecting out from underneath the angle-plate, as shown particularly in Figs. 5 and 10. It is now desirable to cut the candy into the desired cubes, and for this purpose a cutting-blade $y$ is provided and detachably secured to a cutter-bar $z$, which in turn is movably secured to the vertical portion of the angle-plate by means of a pair of links 30, so as to impart what might be termed a "parallel motion" to the bar and its cutter-blade—that is, a downward motion to the right to cut the candy, much as an ordinary knife is used, and then an upward motion to the left to release the candy. In order to give this motion to the cutter-bar at the desired time or times, a grooved cam 31 is provided and secured to the main driving-shaft, as shown particularly in Figs. 1 and 9, the groove of which engages with a roll 32, projecting out from and secured to the left-hand end of the cutter-bar, as shown particularly in Fig. 9. It will be seen that as the main shaft is rotated to the left or in the direction indicated by the arrow in Fig. 4 this cutter-bar is given the motion above described at the proper times to cut the candy.

After the strip of candy has been cut at one end into the desired-size cube 33 it becomes necessary to provide holding means for advancing a piece of paper of the right size into a position adjacent to and underneath the cube of candy and between it and one of the holders, so that the candy and paper may be forced at one and the same operation into the holder to permit of the paper being folded around the candy cube, as hereinafter more fully described.

Describing first the holding mechanism, a rotatable head 34 is provided and mounted on a rotatable supporting-shaft 35, rotatably mounted in suitable bearings in the standards of the machine, as shown particularly in Figs. 3 and 6, and parallel with the main driving-shaft. This rotatable shaft is arranged to rotate in a vertical plane and directly in the path in which the candy strip travels and is provided with a plurality of holding-pockets 36, each of which is in turn arranged to be brought into position directly under a cut cube of candy, as shown particularly in Figs. 16 and 17. One of the side walls of these pockets is made yielding and formed of a spring 37, which permits of the cube of candy, with its attached piece of paper, being yieldingly held in the desired engagement, thus providing for slight differences in size of the candy and for the easy insertion and ejection of the packages.

Describing the means for bringing the strip of paper adjacent to and underneath the cube of candy, (see Figs. 12, 16, and 17,) a roll of paper 38 is provided and mounted in a suitable wheel 138, as shown particularly in Fig. 4. One end of the strip of paper is passed up and over a paper-guide 39 and directly underneath the cube of candy, as shown in Fig. 16. A bell-crank lever 40 is provided, upon which is mounted a pinching-finger 41, adjacent to the upper part of the paper-guide, so that in one position it grasps the piece of paper and prevents the backward movement or withdrawal thereof and in another position of its vibration it raises the pinching-finger, as shown particularly in Fig. 17, and permits the piece of paper to be fed forward, when the candy is forced into engagement with one of the pockets or the head rotated.

To provide for the necessary feeding forward of the paper, as shown in Figs. 16 and 17, a feed-lever 42 is provided and vibratingly mounted upon the supporting-shaft 35, as shown in Fig. 5, one end of which carries what is termed a "pinching-lever" 43, provided with two gripping or pinching rolls 44 and 45, arranged to grasp a depending arm 46 on the bell-crank between them. One of these gripping-rolls 44 is slidingly mounted on a block 47, the sliding block being held under tension by means of a helical spring 48, so that when the feeding-lever is at its lowest position, as shown in Fig. 16, it pulls the depending arm of the bell-crank downwardly, and when the downward limit of movement of such arm is reached the rolls permit the paper-feeding lever to continue the balance of its necessary movements. As soon as the feed-lever starts to go up again the gripping-rolls raise the depending arm, and thereby rotate the bell-crank, releasing the pinching-finger 41 from its contact with the paper. The opposite sides of the feeding-lever 42 (see Fig. 28) is provided with a projecting arm 49, in which a pinching-finger 50 is vibratingly mounted, the finger being secured to the rock-shaft 51, which supports the pinching-lever, so that as such pinching-lever moves downwardly, as shown in Fig. 12, this pinching-finger is released, so as not to draw the strip of paper 38 downwardly against the pinching action of the finger 41; but when the feeding-lever is moved upwardly and the pinching-lever moved to the position shown in Fig. 17, this pinching feeding-finger 50 is vibrated so as to contact the lower wall of the projecting arm 49, grasp the paper between it, move it upwardly, and provide the necessary amount of paper to permit the forcing of the candy cube, with the paper, into engagement with one of the holding-pockets and also permit the movement of the head one step in its rotation, as shown particularly in Fig. 18.

To provide means for forcing the candy cube into contact with the paper and into its proper holding-pocket, a plunger 52 is provided and slidingly mounted upon a back plate 53, having guides 54, all secured to the front face of the vertical portion of the angle-plate. A bracket 55 is provided and secured by its feet portions to the guides 54, for which it acts as caps. To give this plunger its vertical reciprocating motion, an eccentric 56 is provided, having its rod 57 connected to or pivotally engaging with a strap 58, located in the upper end of such plunger. This eccentric is secured to the main shaft of the machine, as shown particularly in Figs. 1 and 5, so that as such shaft is rotated the plunger is raised and lowered and during its lower action forces, as shown in Fig. 17, the candy cube into contact with the paper and both of such articles into engagement with the proper holding mechanism.

It is desirable to provide means for sizing the cube of candy before it passes into engagement with the paper. To accomplish this, a pair of sizing-levers 59 is provided, having inwardly-projecting portions at their lower end and pivotally secured to the back plate 53 at their upper ends and held at their inner limit of motion by means of a helical spring 60. As the candy is forced downwardly by means of the plunger it is passed between the lower inwardly-projecting portions of the sizing-levers, which are moved outwardly until their heels contact the brackets $x$ and their motion stopped, so that as the candy is forced through it is compressed to the desired size.

When the rotatable holding-head has been moved one step in its rotation, it is desirable to provide means for cutting the strip of paper at the desired point. To accomplish this, a cutter is provided having one fixed cutting-blade 160 secured to a sliding block 61, in turn slidingly mounted in a slotted bracket 62, which is rigidly secured to the base of the angle-plate. A second cutting-blade 63 is provided and pivotally mounted on the sliding block, so that both of such blades, as shown particularly in Fig. 13, resemble a pair of shears, between the jaws of which the paper is passed. The sliding block is provided with a pivotal operating-dog 64, having a pin portion engaging with a notch in the pivotal cutting-blade, as shown particularly in Figs. 13 and 14, so that as the block is moved forwardly such dog is brought into contact with a stop 65 and released from its engagement with the pivoted blade to permit a bent metal spring 66 to operate the blade and cut the paper at the desired time. When the sliding block is moved backwardly at the proper time, the dog is brought into contact with the stop-pin 67, secured to the standards of the machine, and as the sliding block continues its backward motion the dog is again forced into the notch of the pivotal blade and against the tension of the spring to permit it to be released and perform its cutting action again and at the proper time. To impart the proper motion to this sliding block and its cutting-blade, the intermediate lever above described is bifurcated at its lower end, as shown at 68 in Fig. 14, to permit a screw-stud 69 on the sliding block to be brought into engagement therewith. It will thus be seen that as motion is imparted to this intermediate vibratable lever by the cam $u$, above described, the paper is cut at the desired time or times.

The forcing of the candy cube and strip of paper into its holding-block and the cutting of the strip of paper above described leaves the package in the position shown in Fig. 19, and thus completes the first folding or wrapping of the paper around the candy cube. It is now desirable that means for the next folding of the paper be provided, as shown in Fig. 20. In order to accomplish this, a rock-shaft 70 is provided and mounted in the lower C-shaped portion of the bracket 55, as shown particularly in Fig. 7. This rock-shaft is provided with a flexible lever 71, preferably formed of hard rubber, having a roller 72 on the free end thereof, so that as the lever is vibrated in one direction, as shown in Fig. 20, it contacts the rear projecting piece of paper and forces it downwardly into engagement with the candy cube. This motion is given to the rock-shaft by means of a projecting arm 73, which is mounted on the main shaft, so as to engage with a projecting arm 74 upon the rock-shaft, as shown in Figs. 1 and 7.

To provide for the third folding of the paper, (see Figs. 7 and 21,) a relatively immovable finger 75 is provided at the upper end of a lever 76, which is pivoted upon a stud 77 upon the standards of the machine, as shown in Fig. 7. This lever is held against movement by means of a link 78, which is pivoted to the lower end thereof and has its bifurcated end in locking engagement with a stud 79 upon the standard of the machine, so that the lever with its folding-finger can be moved outwardly whenever it is necessary to clean or repair the same. The parts are so constructed and arranged, as will be seen from an inspection of Figs. 7, 20, and 21, that when the rotatable head is given the second step in its rotation this relatively immovable folding-finger strikes the front upwardly-projecting piece of paper and folds it over upon the second fold, as shown particularly in Fig. 1.

When the second and third foldings have been provided for, it is necessary to provide for the next or fourth folding of the paper. To accomplish this result, a pair of folding-fingers 80 is provided and pivotally secured to the upper portion of an L-shaped lever 81, (see Fig. 10,) so that as this lever is moved inwardly toward the rotatable head the forward ends of these folding-fingers are brought into engagement with the forward portion of the extending free ends of the paper (see Fig. 23) to fold such portions inwardly. When they have performed their function, as shown in Fig. 23, inwardly-projecting cam portions 82 upon such levers contact a rearwardly-projecting lug 83 upon the relatively immovable lever 76. A further movement of the L-shaped lever in a forward direction forces the forward ends of the folding-fingers outwardly against the tension of a coiled spring 84 and out of contact with the paper.

The fourth folding having been provided for, it is necessary to provide for the fifth folding. In order to accomplish this, a pair of inwardly-projecting immovable fingers 85 is provided, secured to the L-shaped lever, as shown particularly in Figs. 12 and 24, so that when such lever is moved to its inward limit of motion these fixed fingers are brought into the position shown in Fig. 24 to contact the upper ends of the strip of paper, fold such ends downwardly, and hold them in such position until the rotatable head is again moved and the next folding accomplished.

To provide for the sixth folding, the immovable lever 76 is provided with inwardly-projecting side plates 86, that span the outer peripheral edges of the rotatable head in such manner as to fold the endwise-projecting portion of the paper flat against the ends of the package and in a plane therewith, as shown particularly in Fig. 25, and leave it in position for the seventh and last folding.

To provide for the seventh and final folding, a second pair of pivotal folding-fingers 87 is provided and pivoted to the frame portion, on which a receiving-channel is mounted, as shown particularly in Figs. 26, 10, and 11. The forward ends of these folding-fingers are curved and project inwardly, as shown at 88, and have upwardly-extending horn-shaped pieces 89, arranged adjacent to and underneath the path through which the bottom of the candy-holders pass, so that as the head is rotated past these upwardly-projecting horn-shaped pieces the rearwardly-projecting ends 90 of the candy-package are folded inwardly and against the bottom of the package, thus completing the package, as shown in Fig. 27.

It is now necessary to eject the completed package from engagement with the holder and into a desired channel, from which it may pass into any desired receptacle or be taken by the operative for packing. To accomplish this result, a pair of L-shaped ejecting-levers 91 is provided and pivotally secured to a lug 92 upon a second standard 93, which in turn is secured to the bed of the machine. These ejecting-fingers are arranged to swing across the face of the rotatable head or at each side thereof from the center to the periphery to eject the candy and back into initial position, as shown in Fig. 7, to prepare for the next ejection. To operate such levers, they are mounted upon a rock-shaft 94, provided with a lever-arm 95, engaged with the vibratable paper-feeding lever by means of a link 96, as shown particularly in Fig. 5, so that as such vibratable lever is operated by the means hereinafter described these ejecting-fingers are likewise operated and forced between the forward curved ends of the pivoted levers that perform the last folding operation, as shown particularly in Fig. 11, when they contact the completed package and force it into the delivery-channel 97. The final folding-fingers are kept under the desired tension by means of the springs 98.

Describing the means for imparting motion to the vibratable paper-feeding lever, an eccentric 99 is provided, having the usual strap and rod 100, which eccentric is mounted upon the main shaft and the end of its rod pivotally connected with the paper-feeding lever, as shown particularly in Fig. 5, so that as the main shaft is rotated the necessary vibrating motion is imparted to the paper-feeding lever. To impart the necessary motion to the L-shaped folding-lever, which, with its movable and fixed fingers, performs the fourth and fifth foldings, an upwardly-extending rod 101 is provided and secured to such lever, as shown particularly in Fig. 5, and its upper end provided with a link 102, in turn pivotally engaged with the eccentric-strap of the eccentric 56, so that as such eccentric is given its proper motion the aforesaid lever and its operating-fingers are operated, as hereinabove described.

In order to impart power and motion from the main shaft $p$ to the supporting-shaft 35 and give the rotatable head its step-by-step rotation, one end of the supporting-shaft is provided with what I term a "slotted gear-plate" 103, having a series of slots 104 therein and a plurality of peripheral concavities 105, one located between each pair of slots, one slot and one concave portion for each pocket in the head. The same end of the main shaft is provided with a rawhide gear tooth or roll 106, secured to a plate or disk 107, which practically forms a single-toothed pinion, which during the rotation of the main shaft comes into contact successively with each of the slots in the gear-plate and gives it one step of its rotation for every rotation of the main shaft. This disk on the main shaft is also provided with the stop-disk 108, made of rawhide and secured thereto and provided with a concaved depression 109 adjacent to the toothed roll, which permits the roll to engage with its proper slot at the desired time; but when it is out of its other engagement the circular or convex portion of the stop-disk engages with a concave depression in the gear-plate and prevents the rotation of such plate. The main shaft is further provided with a driving-pulley 110, arranged to be connected with any desired prime mover or with the desired counter or main shaft, all of which will be understood by those skilled in the art.

It is desirable to provide means by which the unnecessary vibrations of the cutter-bar are prevented. To accomplish this, a steadying-rod 111 is provided, (see Fig. 8,) pivotally secured to the cutter-bar and passed through a perforated block 112, pivotally mounted on the vertical portion of the angle-plate, and interposed between this block and the lower portion of the steadying-rod is a helical spring 113, all acting to prevent unnecessary and small independent vibrations of the cutting-bar, and thus enable it to better perform its functions.

It is desirable at times to move the vertical shafts and indented feed-wheels inwardly or outwardly to obtain the desired grip on the candy strip. In order to accomplish this result, the brackets 114, in which each of these vertical shafts is adjustably mounted, are secured to the vertical portion of the angle-plate by means of the cap-screws 115. One of these brackets, preferably the one to the left, has a projecting lug having a threaded bore, in which one end of a right and left hand screw 116 is inserted, the other end of which has threaded engagement with the frame of the machine. This right and left hand screw has also a plurality of ball arms or levers 117 connected therewith, while a ball-nut 118 engages with the threaded portion of such right and left hand screw adjacent to the projection on the bracket to act as a jam-nut and hold the parts in the desired position. It is desirable also to have supplementary means for holding the paper while the pinching-fingers 41 and 50 are changing their positions. To accomplish this, the paper-guide 39 is provided with a projecting spring 119, as shown particularly in Fig. 12, and passed forwardly and upwardly until it almost contacts the bed of the angle-plate and yieldingly holds the strip of paper against the same, but permits it to move forward at the desired time or times.

It is further desirable to keep the candy down after it has been cut. For this purpose a stripper-bar 120 is provided and secured to the rear surface of the vertical portion of the angle-plate, as shown particularly in Fig. 3, and above the strip of candy, and thus holds such strip of candy in proper position while the cutter-bar is moving out of contact therewith or returning to its initial position. A spring-bracket 121 is also provided and arranged to contact one of the spur-gears on the upper end of the candy-feed shafts, as shown particularly in Fig. 3, and prevent such gear from having a backward motion during the retreating motion of the pawl and lever.

I claim—

1. In a machine of the class described, the combination of a rotatable head provided with a series of holders on its peripheral surface, means for feeding a strip of paper adjacent to one of the holders, a pair of feed-wheels for feeding a strip of candy material into the machine, means for cutting the material into cubes of the desired size, means for feeding a strip of paper into the machine between the cut cube of candy and the holders, means for forcing the cut cube of candy with the paper into one of the holders, means for cutting the paper, and means for wrapping the paper around the material, substantially as described.

2. In a machine of the class described, the combination of a rotatable head provided with a series of holders in its peripheral surface, means for feeding a strip of paper adjacent to one of the holders, a pair of indented feed-wheels for feeding a strip of candy material into the machine and adjacent to the holders, a parallel-movable cutter arranged to cut the strip of candy into cubes, means for feeding a strip of paper into the machine between the cut cube of candy and the holder, means for forcing a cut cube of candy with the paper into one of the holders, means for cutting the paper, and means for wrapping the paper around the candy material to complete the package, substantially as described.

3. In a machine of the class described, the combination of a holding-head mounted so as to rotate in a vertical plane and provided with a series of holders in its peripheral surface, a pair of indented feed-wheels mounted so as to rotate in a horizontal plane and feed the strip of candy material into the machine adjacent to the holders, means for cutting the candy material into cubes of the desired size, means for introducing and feeding a strip of paper into the machine between the holder and the cut cube of candy, means for forcing a cut cube of candy into one of the holders with the paper, means for cutting the paper after it has been inserted in the holder, and means for wrapping the paper around the candy material while in the holder to complete the package, substantially as described.

4. In a machine of the class described, the combination of a rotatable head provided with a series of holding-pockets in its periphery mounted so as to rotate in a vertical plane, a pair of feed-wheels mounted so as to rotate in a horizontal plane above the rotatable holder for feeding a strip of candy material into the machine, means for rotating the feed-wheels in a step-by-step manner, a parallel-movable cutter-bar provided with a cutter for cutting the candy into cubes, means for moving the cutter-bar in a parallel manner, means for inserting and feeding a strip of paper into the machine underneath the strip of candy and above one of the holder-pockets, means for forcing the cut cube of candy with the strip of paper into one of the holders, means for cutting off the paper after it has been inserted in the holder, and means for wrapping the paper around the candy material in the holder to form the completed package, substantially as described.

5. In a machine of the class described, the combination of a rotatable head provided with a series of holding-pockets in its peripheral surface and arranged to rotate in a vertical plane, a pair of indented feed-wheels rotatably mounted in a horizontal plane for feeding a strip of candy material into the machine above the holder, stop mechanism for limiting the inward movement of the candy strip, means for cutting the candy into cubes of the desired size, means for feeding a strip of paper into the machine, means for forcing the cut cube with the strip of paper into engagement with one of the holders, yieldable mechanism for sizing the cut cube of candy as it is being forced into the holder, means for cutting the paper, and means for wrapping the paper around the material while it is in the holder, substantially as described.

6. In a machine of the class described, the combination of a rotatable head provided with a series of holding-pockets in its peripheral surface rotatably mounted in a vertical plane, a pair of feed-wheels mounted above the same so as to rotate in a horizontal plane for feeding a strip of candy into the machine, stop mechanism for limiting the inward feed of the candy, a parallel-movable bar provided with a cutter-plate for cutting the strip of candy into cubes and interposed between the stop mechanism and the feed-wheels, cam mechanism for operating the cutter-bar at the desired time, means for feeding a strip of paper into the machine between the strip of candy and one of the holder-pockets, a plunger for forcing the cut cube of candy with the strip of paper into engagement with one of the holder-pockets, a pair of vibratable sizing-arms interposed between the plunger and the holding-pocket for sizing the cube of candy as it enters into the pocket, means for cutting the strip of paper, and means for wrapping the paper around the candy material while it is in the holder, substantially as described.

7. In a machine of the class described, the combination of a rotatable head provided with a series of holders in its peripheral surface and rotatably mounted in a vertical plane, a pair of indented feed-wheels rotatably mounted in a horizontal plane above the same, a pair of detachable shafts upon which the feed-wheels are mounted, gear-and-ratchet mechanism for giving the feed-wheel shafts a step-by-step rotation to operate the feed-wheels in a like manner and feed a strip of candy into the machine, stop mechanism for limiting the inward feeding movement of the strip of candy, a cutter-blade for cutting the candy into cubes, a parallel-movable bar for operating the cutter-blade, cam mechanism for operating the cutter-bar in a parallel manner, means for feeding the strip of paper into the machine between the strip of candy and the rotatable head, a plunger reciprocating in a vertical plane for forcing the cut cube of candy in connection with the paper into one of the holder-pockets, means for imparting a reciprocating motion to the plunger, means for cutting the strip of paper, and means for wrapping it around the candy material while it is in the rotatable head, substantially as described.

8. In a machine of the class described, the combination of a rotatable head provided with a series of holding-pockets in its peripheral surface and rotatably mounted in a vertical plane, means for feeding a strip of candy into the machine, means for cutting the strip of candy into cubes, means for introducing a strip of paper into the machine between the candy cube and one of the holding-pockets, means for forcing a cube of candy with one end of the strip of paper into one of the holding-pockets to form the first folding, a flexible lever arranged to pass over the periphery of the rotatable head to perform the second folding of the paper, means for operating such lever, a fixed finger for performing the next step of the folding, and means for performing the subsequent folding operations, substantially as described.

9. In a machine of the class described, the combination of a rotatable head provided with a series of holding-pockets in its peripheral surface and arranged to rotate in a vertical plane, means for feeding a strip of candy into the machine, means for cutting such candy strip into cubes, mechanism for feeding a strip of paper into the machine between the cut cube of candy and one of the holding-pockets, means for forcing the cut cube of candy with the end of the strip of paper into one of the holding-pockets to form the first folding, means for cutting off the paper, a vibratable flexible lever 71 mounted adjacent to the periphery of the holding-pocket to perform the next paper-folding operation, a fixed finger 75 for performing the next folding, a pair of side plates 85 spanning the sides of the rotatable head for performing the next folding of the paper, a pair of pivoted levers 88 provided with horn-shaped projections 89 for providing the final folding operations, and means for ejecting the completed package, substantially as described.

10. In a machine of the class described, the combination of a rotatable head provided with a series of holding-pockets in its peripheral surface, means for feeding a strip of candy into the machine, means for cutting it into cubes, mechanism for feeding a strip of paper into the machine between the cut cube of candy and one of the holding-pockets, means for forcing a cut cube of candy with one end of the strip of paper into the machine, means for cutting the paper, a vibratable flexible lever provided with a roll at its free end mounted adjacent to the periphery of the holder to perform the next folding of the paper, a fixed finger mounted adjacent to the periphery of the holder for performing the next folding operation, a second vibratable lever provided with pivoted and fixed fingers for performing the next two folding operations, a pair of side plates spanning the sides or peripheral edges of the rotatable head for performing the next folding operation, a pair of pivoted levers provided with upwardly-projecting horn-shaped pieces arranged one on each side of the rotatable head and back of the holding-pockets for performing the final folding operation, and pivoted ejecting-levers mounted to vibrate between the rear ends of the horn-carrying levers for ejecting the completed package, substantially as described.

11. In a machine of the class described, the combination of a rotatable head provided with a series of holding-pockets in its peripheral surface and arranged to rotate in a vertical plane, a supporting-shaft upon which it is mounted, means for imparting a step-by-step rotation to such shaft, means for feeding a strip of candy material into the machine, means for cutting such candy strip into cubes, paper-feeding mechanism vibratingly mounted on the supporting-shaft for feeding a strip of paper into the machine between the cut cube and one of the holding-pockets, means for forcing the cut cube of candy and the strip of paper into one of the holder-pockets which partially folds the paper, a vibratable flexible lever mounted adjacent to the periphery of the rotatable head to perform the next folding operation, a lever pivoted to the frame of the machine provided with a finger for making the next folding operation, means for detachably holding this lever in fixed position to permit it to be vibrated for cleaning purposes, a second vibratable lever pivoted to the frame of the machine and provided with a pair of pivoted fingers for performing the next folding operation and a pair of fixed fingers for performing the succeeding folding operation, means for moving the pivoted fingers out of engagement with the package during the succeeding folding operation and holding them in such position until its vibratable carrying-lever is moved to its initial position, a pair of side plates secured to the first-named fixed lever and spanning the peripheral edges of the rotatable head for performing the next folding operations, a pair of pivoted levers secured to the frame of the machine and provided with upwardly-projecting horns at their inner ends and at the bottom of the holder-pockets for performing the final folding operations, and a pair of vibrating ejecting-levers pivoted to the frame of the machine moving between the ends of the last-named folding-levers to eject the completed package, substantially as described.

12. In a machine of the class described, the combination of a rotatable head provided with a series of holding-pockets in its peripheral surface, a supporting-shaft for rotating such head in a vertical plane, means for feeding a strip of candy into the machine, means for cutting the strip of candy into cubes, a supporting-block forming a paper channel or guide arranged intermediate the periphery of the rotatable head and the candy-feeding mechanism for guiding a strip of paper into position between the cut cube of candy and one of the holding-pockets, a vibratable feed-lever loosely mounted upon the supporting-shaft and provided with gripping mechanism at its outer end to grip the paper during its forward motion and feed it along the paper-channel and release it during its rearward motion to prevent its withdrawal from the machine, means for forcing the cut cube of candy with the end of a strip of paper into one of the holding-pockets, mechanism for wrapping the paper around the candy while it is in the head, and means for ejecting the completed package, substantially as described.

13. In a machine of the class described, the combination of a rotatable head provided with a series of holding-pockets in its peripheral surface, a supporting-shaft upon which it is mounted for rotating it in a vertical plane, a main shaft, intermeshing gear mechanism engaged with both shafts for imparting a step-by-step rotation to the supporting-shaft and its rotatable head, means for feeding a strip of candy into the machine above the rotatable head, means for cutting the strip of candy into cubes, a paper-guide arranged intermediate the rotatable head and the candy-feeding mechanism for guiding a strip of paper into position between the holding-pocket and the cut cube of candy, a bell-crank lever provided with a finger for gripping the paper on the paper-guide to prevent its withdrawal, a depending arm on such bell-crank lever, a vibratable paper-feeding lever loosely mounted on the supporting-shaft and provided with a pinching mechanism at its outer end for gripping the depending arm on the bell-crank lever to raise and lower it during the vibrations of the feeding-lever, gripping mechanism on the outer end of such paper-feeding lever for gripping the paper during the forward or upper movement of the paper-feeding lever to move the paper forward and release it during its retreating movement to prevent the withdrawal of the paper, means for forcing the cut cube of candy with the end of the strip of paper into engagement with one of the holding-pockets to perform the first folding, means for performing the remaining folding or wrapping of the paper around a cube of candy while it is in engagement with the head, and means for ejecting the completed package, substantially as described.

14. In a machine of the class described, the combination of a rotatable head provided with a series of holding-pockets in its peripheral surface, a supporting-shaft upon which it is mounted, means for imparting a step-by-step rotation to the supporting-shaft and rotatable head, means for feeding a strip of candy into the machine, means for cutting the strip of candy into cubes, a paper-guide arranged intermediate the periphery of the rotatable head and the feeding mechanism, a bell-crank lever provided with a pinching-finger arranged adjacent to the paper-guide for gripping the paper at the proper time and preventing its withdrawal from engagement with the machine but permitting it to be fed inwardly, a depending arm on such bell-crank lever, a vibratable paper-feeding lever loosely mounted on the supporting-shaft, a rock-shaft at its outer end provided with a lever carrying two pinching-rolls, one rotatably fixed on such lever and the other rotatably and slidingly mounted thereon grasping the depending arm on the bell-crank lever during both vibrations of the paper-feeding lever and moving it with its rock-shaft a short distance of the movement of such feeding-lever and then rolling over such depending arm during the remaining movement, the engagement of such pinching-rolls and depending arm acting to swing the pinching-lever independently during the vibratory movements of the feeding-lever, a pinching-finger on the pinching-lever rock-shaft arranged to be operated by the movements thereof and grasp and release the strip of paper to feed it forward at the proper times, means for feeding the cut cube of candy and the end of the strip of paper into engagement with one of the holding-pockets, means for cutting off the strip of paper, means for wrapping the paper around the cut cube of caramel while it is in the holder to form the package, and means for ejecting the completed package from its engagement with the holder, substantially as described.

15. In a machine of the class described, the combination of a vertically-rotatable head provided with a series of pockets in its peripheral surface, a supporting-shaft upon which such head is mounted, a main driving-shaft, intermeshing gear mechanism on such shafts to impart a step-by-step rotation to the supporting-shaft and head, a pair of indented feed-rolls arranged to rotate in a horizontal plane and feed a strip of candy into the machine adjacent to the holding-pockets of the rotatable head, stop mechanism for limiting their inward movement, a pair of vertically-arranged shafts for operating such candy-feeding rolls, a pair of intermeshing gears on such shafts to rotate the same, a ratchet secured to one of such intermeshing gears, a pawl-lever vibratingly mounted adjacent to such ratchet and provided with a pawl engaging with the ratchet to rotate it in a forward step-by-step manner, a vibratable intermediate lever secured to the frame of the machine, a connecting-link securing such intermediate lever with the vibratable pawl-lever, a cam on the main shaft engaging such intermediate lever to impart to it the desired vibrations, means for cutting the candy strip into cubes, means for feeding a strip of paper into the machine between the rotatable holder and the cut cube of candy, a vertically-movable plunger arranged to contact the cube of candy and force it and the end of the strip of paper into engagement with one of the holding-pockets to perform the first folding, means for cutting off the strip of paper, means for completing the folding of the paper around the cube of candy during the step-by-step rotation of the holding-head, means for ejecting the completed package from engagement with the head, and mechanism on the main shaft engaging the vertically-movable plunger to give it its proper reciprocating motions, substantially as described.

16. In a machine of the class described, the combination of a rotatable holder provided with a series of pockets in its peripheral surface, a supporting-shaft upon which it is mounted to rotate it in a vertical plane, a main driving-shaft, intermeshing gear mechanism on such shafts for imparting a step-by-step rotation to the supporting-shaft and its head, means for feeding a strip of candy into the machine, a parallel-movable cutter-bar provided with a cutting-blade for cutting the strip of candy into cubes, link mechanism securing such parallel-moving bar to the frame of the machine to permit of the proper movements of the bar, a guiding-rod pivotally secured to such cutter-bar and slidingly mounted in a block on the frame of the machine, a helical tension-spring surrounding such guiding-rod and interposed between it and the block to take up and absorb the unnecessary vibrations of the cutter-bar, cam mechanism on the main shaft for operating the parallel-movable bar, means for feeding a strip of paper into the machine, means for forcing the cut cube of candy with the paper into the machine, means for cutting the paper, means for wrapping the paper around the cut cube of candy, and means for ejecting the completed package from its engagement with the head, substantially as described.

17. In a machine of the class described, the combination of a rotatable head provided with a series of holding-pockets in its peripheral surface and arranged to rotate in a vertical plane, a supporting-shaft upon which it is mounted, a main shaft having gear engagement with the supporting-shaft for imparting a step-by-step rotation thereto, means for feeding a strip of candy into the machine, means for cutting the strip of candy into cubes, means for feeding a strip of paper into the machine between one of the holding-pockets in the rotatable head and the cut cube of candy, means for forcing the cut cube of candy with the end of a strip of paper into engagement with one of the holding-pockets, means for cutting off the strip of paper, comprising a fixed blade, a slidable block to which it is secured, a pivotal blade between which and the fixed blade the paper is grasped and cut, spring mechanism for operating the pivotal blade and furnishing power to perform the cutting, a pivoted dog for holding the pivoted blade in its potential position, means for moving the sliding block backwardly and forwardly to release the pivoted dog and permit the cutting operations and force the pivoted dog into engagement with the pivotal blade to return it to its initial or potential position, means for folding the paper around the candy cube, and means for ejecting the completed package from its engagement with the rotatable head, substantially as described.

HARRY Y. ARMSTRONG.

Witnesses:
THOMAS F. SHERIDAN,
HARRY I. CROMER.